United States Patent [19]
Madsen et al.

[11] Patent Number: 5,842,559
[45] Date of Patent: Dec. 1, 1998

[54] OBJECT STABILIZING DEVICE

[75] Inventors: Thomas C. Madsen; Maurice J. Hunking, both of Walla Walla, Wash.

[73] Assignee: Key Technology, Inc., Walla Walla, Wash.

[21] Appl. No.: 827,830

[22] Filed: Apr. 11, 1997

[51] Int. Cl.⁶ .................................................. B65G 15/14
[52] U.S. Cl. .................... 198/626.5; 198/626.1; 198/620; 198/604; 198/416; 198/836.1
[58] Field of Search ................................. 198/836.1, 416, 198/382, 604, 620, 626.1, 626.5

[56] References Cited

U.S. PATENT DOCUMENTS

| | | |
|---|---|---|
| 3,495,696 | 2/1970 | Molins et al. . |
| 3,618,746 | 11/1971 | Suloff . |
| 3,783,990 | 1/1974 | Siciliano . |
| 3,880,274 | 4/1975 | Bechtloff et al. . |
| 4,008,801 | 2/1977 | Reilly et al. . |
| 4,230,218 | 10/1980 | Kunzmann . |
| 4,285,621 | 8/1981 | Spencer . |
| 4,723,650 | 2/1988 | Hartmann et al. ....................... 198/626 |
| 4,815,581 | 3/1989 | Deutschlander . |
| 5,626,219 | 5/1997 | Deefholts et al. ................... 198/626.5 |

*Primary Examiner*—William E. Terrell
*Assistant Examiner*—Patrick Mackey
*Attorney, Agent, or Firm*—Wells, St. John, Roberts, Gregory & Matkin, P.S.

[57] ABSTRACT

An object stabilizing device for use with a continuous moving surface is disclosed and which includes a drive roller disposed in spaced relation relative to a continuous moving surface; and a flexible continuous belt having a proximal end driven by the drive roller and an unentrained distal end which is disposed in rested relation on the continuous moving surface.

5 Claims, 3 Drawing Sheets

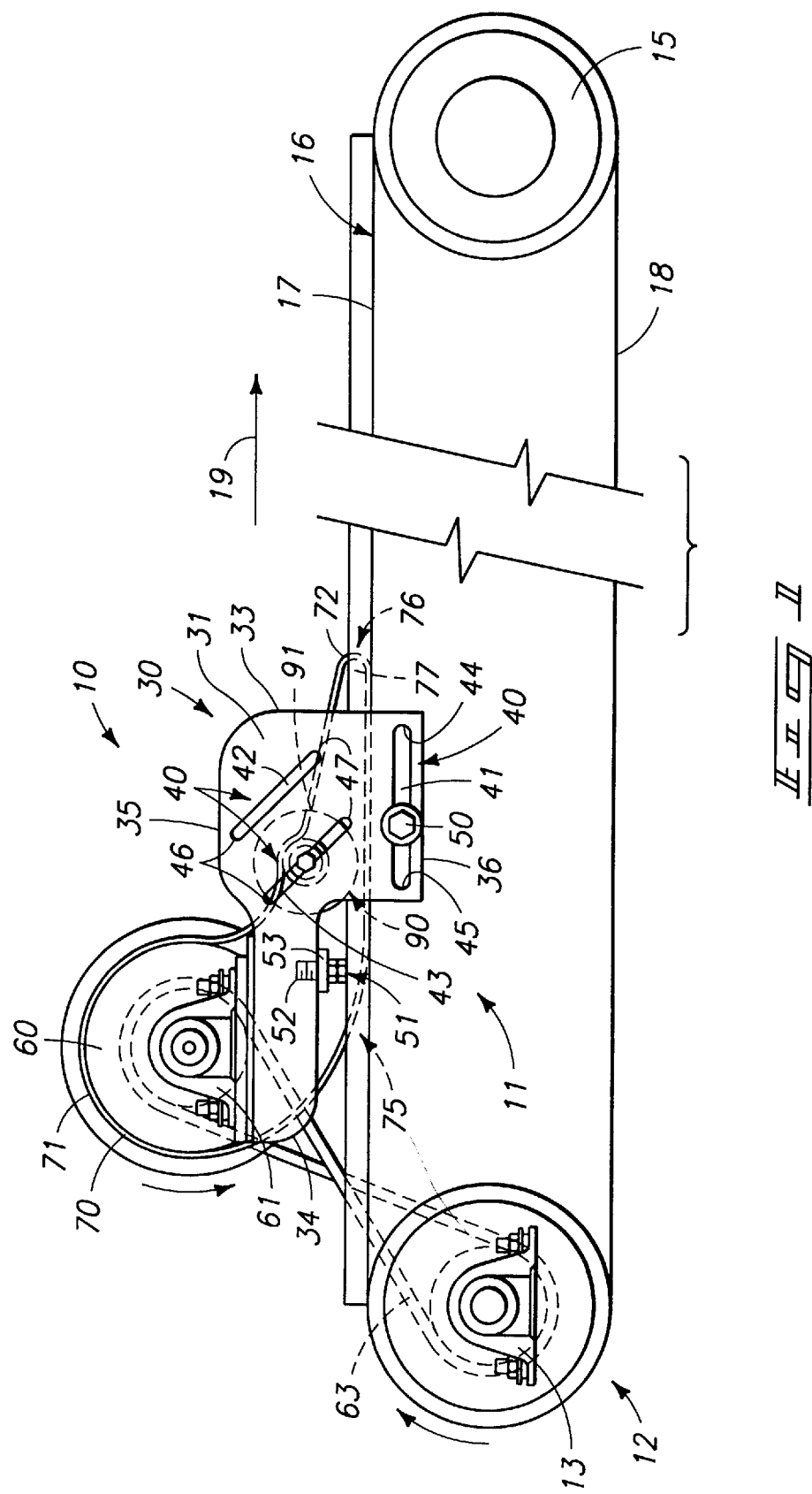

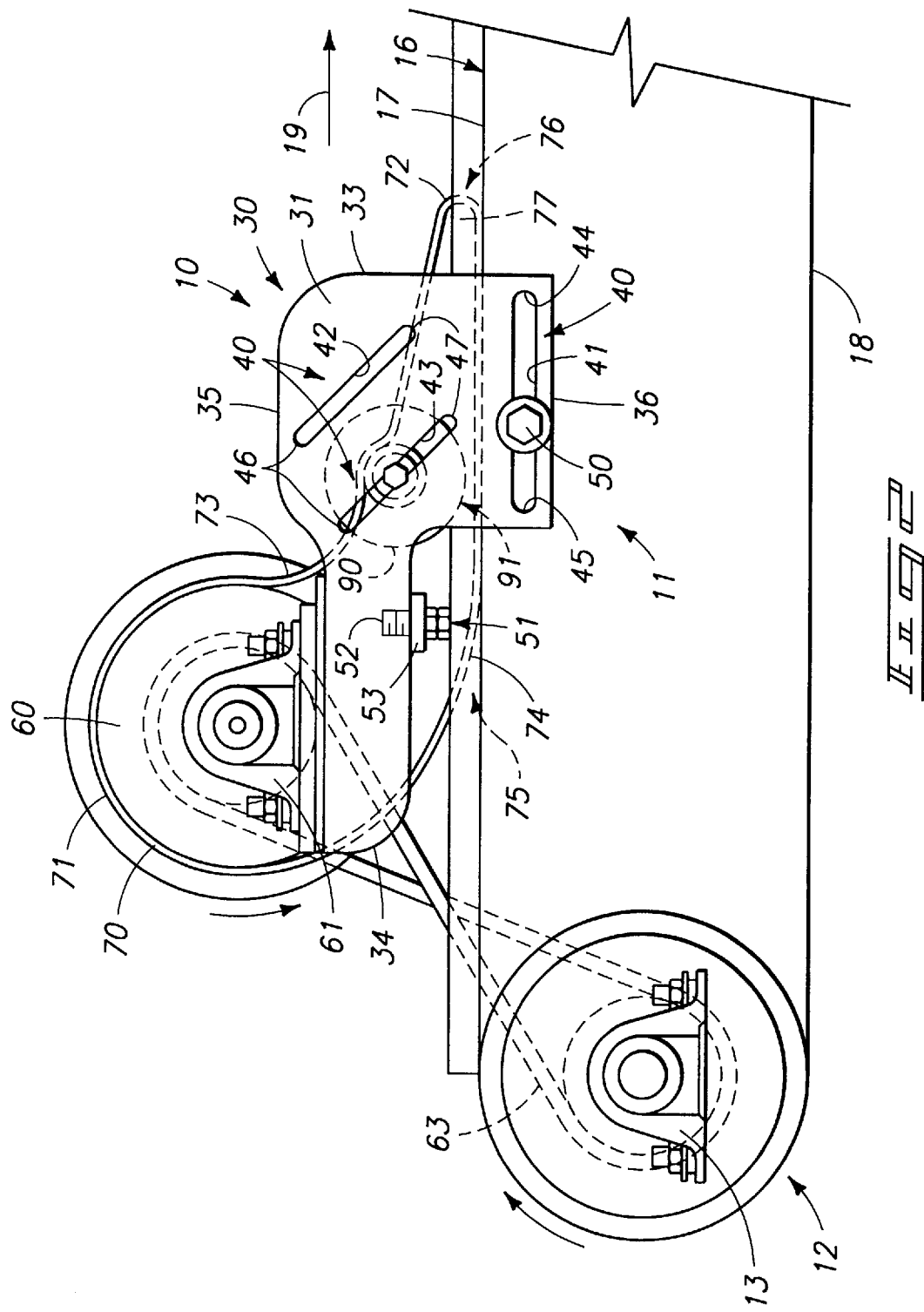

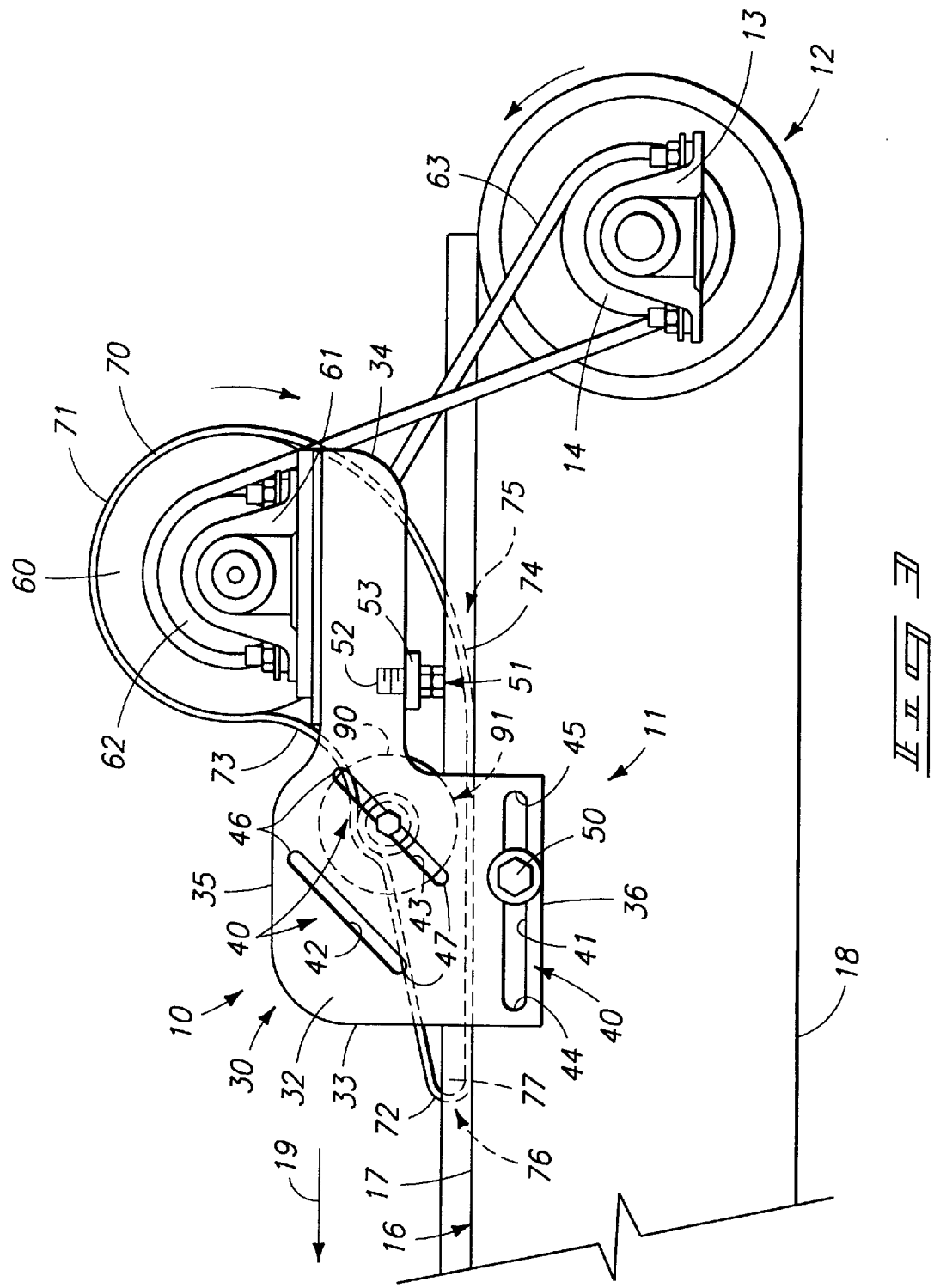

OBJECT STABILIZING DEVICE

TECHNICAL FIELD

The present invention relates to an object stabilizing device, and more particularly to an apparatus which is used in combination with a conveyor assembly which transports objects of interest along a given path of travel.

BACKGROUND OF THE INVENTION

The prior art is replete with numerous examples of conveyor assemblies which are adapted to treat or otherwise manipulate a bulk product stream in a particular fashion to achieve a given end product. In this regard, and in the processing of bulk food products such as french fries, green beans, and assorted other agricultural products, conveyor assemblies are employed to move the given product along a predetermined path of travel and through a sorting station. The sorting station includes various imaging equipment, such as line scan cameras and the like, and which are operable to produce an electronic image of the product passing through the sorting station. This electronic image is then processed by a computer which determines whether individual products in the stream achieve certain predetermined quality standards. The computer thereafter provides a sorting signal to various mechanisms, such as an air manifold, which then provides a jet of air which diverts undesirable products from the bulk stream. Through this sorting process a given, homogeneous end product is produced.

While the prior art conveyor devices have operated with varying degrees of success, they have shortcomings that have detracted from their usefulness. More particularly, and in the sorting system described above, it is imperative that the product to be sorted remain relatively motionless on the conveyor assembly transporting same to the sorting station. In particular, lateral displacement of the product relative to direction of movement of the conveyor assembly causes the aforementioned sorting process to be inefficient and inaccurate. This lateral displacement is due, in part, to the speed of motion of the conveyor assembly as well as the inertia of the bulk product which is being received and transported on same.

Still another deficiency with the prior art conveyor devices results from characteristics inherent in their design inasmuch as the bulk food product being deposited on these same conveyor assemblies tends to be deposited on the conveyor assembly in a random orientation, that is, individual french fries, for example, are not all oriented in the same direction relative to the direction of movement of the conveyor assembly. Consequently, some of the bulk food product may be located in partial, covering relation relative to some of the adjoining food product, and therefore, imaging devices, located in the sorting station may not be able to image substantially the entire surface area of each of food products passing through the sorting station. In any event, and in both instances noted above, the resulting end product may be undesirable because it does not reach the quality or grade standards which have been predetermined by the end user. Consequently, additional measures are frequently implemented to insure that quality standards are met. However, these additional measures are often time consuming and labor intensive, thus causing the final end product to be somewhat more costly for the end consumer.

Therefore, it has long been known that it would be desirable to have an object stabilizing device for use with a continuous moving surface, and which enhances the operation of the conveyor assembly employed with same, and which further obtains the individual benefits to be derived from the related prior art devices and practices while avoiding the detriments individually associated therewith.

BRIEF DESCRIPTION OF THE DRAWINGS

Preferred embodiments of the invention are described below with reference to the following accompanying drawings.

FIG. 1 is a partial, longitudinal, vertical sectional view of the device shown in a typical operative configuration.

FIG. 2 is a simplified, fragmentary, longitudinal, vertical sectional view of the object stabilizing device of the present invention.

FIG. 3 is a simplified, longitudinal, vertical sectional view of the object stabilizing device of the present invention, which is taken from a position opposite to that shown in FIG. 2.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The object stabilizing device of the present invention is generally indicated by the numeral 10 in FIG. 1. As shown therein, the object stabilizing device is illustrated as it would be employed with a conveyor assembly 11 which is operable to transport objects of interest along a given path of travel. While the device of the present invention is shown in use with a conveyor assembly 11, it will be recognized that the present invention may be employed on all manner of devices which are utilized for moving bulk products along given path of travel. The present apparatus is therefore useful on other devices and is not confined to the continuous belt conveyor assembly 11 as depicted.

Referring now to FIG. 1, the object stabilizing device 10 is shown in use in combination with a conveyor assembly 11. The conveyor assembly 11 is of conventional construction. In particular, the conveyor assembly 11 includes a first, or drive roller 12. A motor, not shown, is disposed in force transmitting relation relative to the drive roller 12 and accordingly imparts motion to same. Suitable bearings 13 facilitate the rotation of the drive roller 12 in a given direction. As seen in FIG. 3, a pulley 14 of conventional design is fixedly attached to the driver roller 12 and rotates therewith. Positioned in predetermined spaced relation relative to the first or drive roller 12 is a second or idler roller 15. As illustrated in FIG. 1, a flexible, continuous belt, or moving surface 16 is entrained between the first and second rollers 12 and 15, respectively. The continuous belt or moving surface 16 has an upper or transporting course 17 and a lower or s return course 18. The upper course 17 moves in a predetermined direction of travel which is generally indicated by the line labeled 19.

The object stabilizing device 10 includes a frame which is generally indicated by the numeral 30. The frame 30 includes first and second members 31 and 32, which are movably mounted on the opposite sides of the conveyor assembly 11. This is best seen by reference to FIGS. 2 and 3, respectively. As such, the first and second members are disposed in substantially parallel spaced relation one to the other. The first and second members 31 and 32 are substantially mirror images of each other. Consequently, for brevity sake, the features of the first and second members are commonly described hereinafter and bear the same identifying numerals. As best seen in FIGS. 2 and 3, the first and second members 31, and 32 each have a forward or first end 33, and an opposite, rearward or second end 34. Further, each of the members 31 and 32 have a top edge 35, and an opposite bottom edge 36. As shown in FIGS. 2 and 3, a plurality of apertures 40 are formed in predetermined positions in the first and second members 31 and 32, respectively. In this regard, the plurality of apertures 40 include a first aperture 41, and second and third apertures 42 and 43, respectively. The first aperture 41 is narrowly elongated and positioned along the bottom edge 36. The first aperture 41 has a first or forward end 44 and an opposite or second end 45. Further, the second and third apertures 42, and 43 are disposed in a given angular orientation relative to the first aperture 41, and are also disposed in predetermined, substantially parallel relation one to the other. The second and third apertures are also narrowly elongated, and have an upper end 46 and a lower end 47.

A threaded bolt 50 is received in each of the apertures 41 and threadably mates with the conveyor assembly 11. As such, the bolts 50 releasably secures the first and second members 31 and 32 thereto. In this arrangement, the frame 30 is rendered movable relative to the conveyor assembly 11. An elevation adjustment member 51 is borne by the frame 30. The elevation adjustment member includes a screw-threaded shaft 52, and a locking member 53 which is borne on the shaft 52. The elevation adjustment member causes the frame 30 to rotate about the bolt 50 thereby permitting the selective adjustment of the frame 30 relative to the conveyor assembly 11.

A drive roller 60 is disposed in spaced relation relative to the continuous moving surface 16 of the conveyor assembly 11. The drive roller 60 is mounted for rotational movement within a pair of bearings 61. The individual bearings 61 are secured on the frame 30, as illustrated. As best seen in FIG. 3, a pulley is received on the drive roller 60, and a drive belt 63 is received about pulleys 14 and 62, thereby connecting the drive roller 60 in force receiving relation relative to the first roller 12. As should be understood, therefore, when an engine, not shown, imparts rotational movement to the first roller 12, this force is further transmitted through the drive belt 63 to the drive roller 60 thereby causing rotational movement of the drive roller in the direction as shown.

A flexible continuous belt 70 is received about the drive roller 60 and extends in the direction of movement 19 of the continuous conveyor 11. The flexible continuous belt has a proximal end 71, which is received about the drive roller 60, and further has an unentrained distal end 72, which is disposed in rested relation on the continuous moving surface 16 of the conveyor assembly 11. The flexible continuous belt 70 has an upper course 73, and an opposite, lower course 74. Further, the lower course 74 defines an entrance angle 75 with the underlying continuous moving surface 16 which is less than about 60 degrees. Yet further, the lower course 74 defines an exit angle 76 with the conveyor assembly 11 which is tangent to the exit radius in the direction opposite to the direction of travel 19 of the conveyor assembly 11. As best appreciated by a study of FIG. 3, the distal end 72 of the flexible conveyor belt 70 has an exit radius 77 which is less than about two inches. Additionally, the flexible continuous belt 70 has a weight of about 1.25 pounds per square foot. The flexible continuous belt may be manufactured from a number of different materials, providing, of course, that the belt meets the foregoing parameters. Still further, the continuous belt 70 may have a substantially continuous surface or further, may have apertures and/or lanes formed therein to facilitate the foregoing objectives. The present arrangement of the device 10 results in the flexible continuous belt 70 being driven by the drive roller 60 at a speed which is substantially identical to the underlying continuous moving surface 16 of the conveyor assembly 11. It has been discovered that the entrance angle 75, as earlier described is important to the operation of the present device 10. In this regard, it has been found that a shallow entrance angle, (less than about 60 degrees), facilitates the alignment of the product with the direction of belt travel 19. The entrance angle also inhibits the product from piling up or accumulating in front of the object stabilizing device 10 as it begins to travel down the conveyor assembly 11. Yet further, the exit radius 77 is important to the present device 10 inasmuch as the product, when it comes out from under the lower course 74, at the distal end 72, tends to be lifted up by the adhesion force that it has with the continuous belt 70. This lifting of the product off of the moving surface 16 has the effect of destabilizing the bulk product which is being transported. This problem is acute for products which are particularly small, or wet. Consequently, a small exit radius facilitates the transportation of the product inasmuch as the momentum of the product being sorted overcomes the existing adhesion force. Consequently, the product separates cleanly from the lower course 74 of the flexible continuous belt 70 and does not remain adhesively attached on same. As will be recognized, the frame 30 can be adjusted relative to the conveyor assembly 11 to further shape the entrance angle 75 of the flexible continuous belt 70.

As noted above, to facilitate the use of the present object stabilizing device 10, the flexible continuous belt 70 must be propelled at a speed which is substantially identical to the underlying conveyor assembly 11. As best appreciated by a study of FIG. 1, because the flexible continuous belt 70 is carried downstream, or in the direction of movement 19, by the conveyor assembly 11, it is not possible to move the flexible continuous belt 70 appreciably faster than the speed of the moving surface 16. If the flexible continuous belt 70 travels faster around the drive roller 60, by even a small amount, the product being transported by the conveyor assembly 11 soon begins to accumulate, or pile up, upstream of the drive roller 60. On the other hand, if the flexible continuous belt 70 travels significantly slower than the underlying conveying assembly 11, the product being transported tends to roll, or is in shear between the two belts 16 and 70. When this event happens, the product tends to recoil or otherwise be propelled into motion in relation to the conveyor assembly 11. To finely adjust the speed of the flexible continuous belt 70 a speed adjustment member, or training bar 90 is provided. The speed adjustment member 90 comprises a shaft 91 which is releasably affixed, in a given orientation between the upper and lower ends 46 and 47 of the second or third apertures 42 and 43 respectively. As such, the shaft 91 is operable to impart a given amount of slip between the flexible continuous belt 70 and the drive roller 60 which is positioned in force receiving relation relative thereto. By imparting a given amount of slip to the flexible continuous belt 70, the speed of the flexible continuous belt 70 can be finely adjusted relative to the underlying conveyor assembly 11. As will be recognized, the first and second apertures permit the shaft 91 to be moved into given positions relative to the flexible continuous belt 70 to accommodate various operating conditions and speeds for of the underlying conveyor assembly 11.

OPERATION

The operation of the described embodiment of the present invention is believed to be readily apparent and is briefly summarized at this point.

A first aspect of the present invention relates to an object stabilizing device 10 for use with a continuous moving surface 16 which transports objects of interest, the object stabilizing device comprising a drive roller 60 disposed in spaced relation relative to the continuous moving surface 16; and a flexible continuous belt 70 having a proximal end 71 driven by the drive roller 60, and an unentrained distal end 72 which is disposed in rested relation on the continuous moving surface 16.

Another aspect of the present invention relates to an object stabilizing device 10 for use with a conveyor assembly 11 having a continuous moving surface 16 which transports objects of interest, the object stabilizing device 10 comprising a frame 30 borne by the conveyor assembly 11; a drive roller 60 borne by the frame 30; a flexible continuous belt 70 having a proximal end 71 which is borne by the drive roller 60, and an unentrained distal end 72 which is disposed in rested relation on the continuous moving surface 16 of the conveyor assembly 11; and means for driving the drive roller 63 at a given speed.

Yet still a further aspect of the present invention relates to an object stabilizing device 10 for use with a conveyor assembly 11 having a continuous moving surface 16 which transports objects of interest, the object stabilizing device 10 comprising a frame 30 borne by the conveyor assembly 11 and which is selectively adjustable relative thereto; a drive roller 60 borne by the frame 30 and which is rotatable in a given direction, the drive roller 60 mounted in spaced relation relative to the continuous moving surface 16; a flexible continuous belt 70 having a proximal end 71 which is borne by the driver roller 60, and an unentrained, distal second end 72 which is disposed in rested relation on the continuous moving surface 16 of the conveyor assembly 11, the flexible continuous belt 70 extending in the direction of movement 19 of the continuous moving surface 16 of the conveyor assembly; means for driving the drive roller 63, the drive roller 60 imparting a speed of movement to the flexible continuous belt 70 which is substantially equal to the speed of movement of the moving surface 16 of the conveyor assembly 11; and a member 90 borne by the frame 30 and positioned in contact with the flexible continuous belt 70, the member being adjustably movable relative to the flexible continuing belt 70 and operable to adjust the speed of movement of the flexible continuous belt 70.

As earlier discussed, the flexible continuous belt forms an entrance angle 75 and an exit angle 76 relative to the moving surface 16 of the conveyor assembly 11. As disclosed, the entrance angle is less than about 60 degrees, and the exit angle is tangent to the exit radius in a direction opposite to the direction of travel 19 of the conveyor assembly 11. Still further, the flexible continuous belt 70 has a given weight of about 1.25 pounds per square foot and has an exit radius 77 of less than about two inches.

As disclosed herein, the object stabilizing device 10 of the present invention provides an improved means for stabilizing objects of interest which are being transported along by a conveyor assembly 11 for subsequent visual inspection or other commercial purposes.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An object stabilizing device for use with a conveyor assembly which transports objects of interest, comprising:

a first rotatable roller;

a second rotatable roller disposed in spaced relation relative to the first roller;

a first flexible continuous belt entrained between the first and second rollers, the flexible continuous belt having an upper transporting course for supporting and conveying the objects of interest, and a lower return course;

a first pulley mounted on the first roller and being rotatable therewith;

a motor disposed in force transmitting relation relative to the first roller and imparting rotational movement thereto, and wherein the motor drives the first flexible continuous belt at a predetermined speed and in a given direction;

a frame positioned adjacent to the first flexible belt and near the first roller;

an elevation adjustment member mounted on the frame and operable to change the position of the frame relative to the upper transporting course of the first flexible continuous belt;

a drive roller rotatably mounted on the frame and positioned in spaced relation relative to the upper transporting course of the first flexible continuous belt;

a second pulley mounted on the drive roller and being rotatable therewith;

a drive belt received about the first and second pulleys, and wherein the drive roller is disposed in force receiving relation relative to the first rotatable roller;

a second flexible continuous belt received about the drive roller and extending in the direction of movement of the first flexible continuous belt, and wherein the second flexible continuous belt has a proximal end which is received about the drive roller, and an unentrained distal end which is disposed in rested relation on the upper transporting course of the first flexible continuous belt, and wherein the second flexible continuous belt has an upper course and a lower course which rests in engagement with the upper transporting course, and wherein the lower course of the second flexible continuous belt defines an entrance angle with the underlying upper transporting course which is less than about 60 degrees, and wherein the lower course of the second flexible continuous belt further defines and exit angle with the underlying upper transporting course which is tangent to the exit radius in the direction opposite to the direction of travel of the first flexible continuous conveyor, and wherein the distal end of the second flexible continuous belt has an exit radius of less than about 2 inches, and wherein the second flexible continuous belt has a weight of less than about 1.25 pounds per square foot, and wherein the motor drives the second flexible continuous belt at a speed which is substantially equal to the speed of movement of the first flexible continuous belt; and a bar mounted on the frame and which operably engages the upper course of the second flexible continuous belt to induce slip between the second flexible continuous belt and the drive roller, and wherein the induced slip is employed to finely adjust the speed of movement of the second flexible continuous belt relative to the speed of movement of the underlying first flexible continuous belt.

2. An object stabilizing device in combination with a continuous moving surface which transports objects of interest at a given speed, the object stabilizing device comprising:

a frame disposed adjacent to the continuous moving surface a drive roller rotatably mounted on the frame and disposed in overlying spaced relation relative to the continuous moving surface;

a flexible continuous belt having a proximal end which is received about the drive roller, and an unentrained distal end which rests on the continuous moving surface, and wherein the drive roller drives the flexible continuous belt at a given speed; and a bar mounted on the frame and which engages the flexible continuous belt to induce slip between the flexible continuous belt and the drive roller, the induced slip being employed to adjust the speed of movement of the flexible continuous belt such that it is substantially identical to the speed of the underlying continuous moving surface.

3. An object stabilizing device as claimed in claim 2, wherein the continuous moving surface is a conveyor assembly having a continuous belt, and wherein the continuous belt is entrained between a first and second roller; and wherein a pulley is mounted on the first roller, and the drive roller, and wherein a belt is receive about each of the pulleys, and wherein the first roller is disposed in force transmitting relation relative to the drive roller and is effective to impart rotational movement to the drive roller.

4. An object stabilizing device as claimed in claim 3, and further comprising an elevation adjustment member mounted on the frame and effective to change the position of the frame relative to the continuous moving surface.

5. An object stabilizing device as claimed in claim 4, wherein the flexible continuous belt defines an entrance angle with the underlying continuous belt which is less than about 60 degrees, and the distal end of the flexible continuous belt further has an exit radius of about 2 inches.

* * * * *

UNITED STATES PATENT AND TRADEMARK OFFICE
CERTIFICATE OF CORRECTION

PATENT NO. : 5,842,559
DATED : December 1, 1998
INVENTOR(S) : Thomas C. Madsen, et. al.

It is certified that error appears in the above-identified patent and that said Letters Patent is hereby corrected as shown below:

Column 2, line 56, after the word "or", delete the letter "s".

Signed and Sealed this

Ninth Day of March, 1999

Attest:

Q. TODD DICKINSON

*Attesting Officer*    *Acting Commissioner of Patents and Trademarks*